Aug. 9, 1949. R. D. WHALEN ET AL 2,478,795
TRAILER CONSTRUCTION
Filed Aug. 7, 1946 3 Sheets-Sheet 3
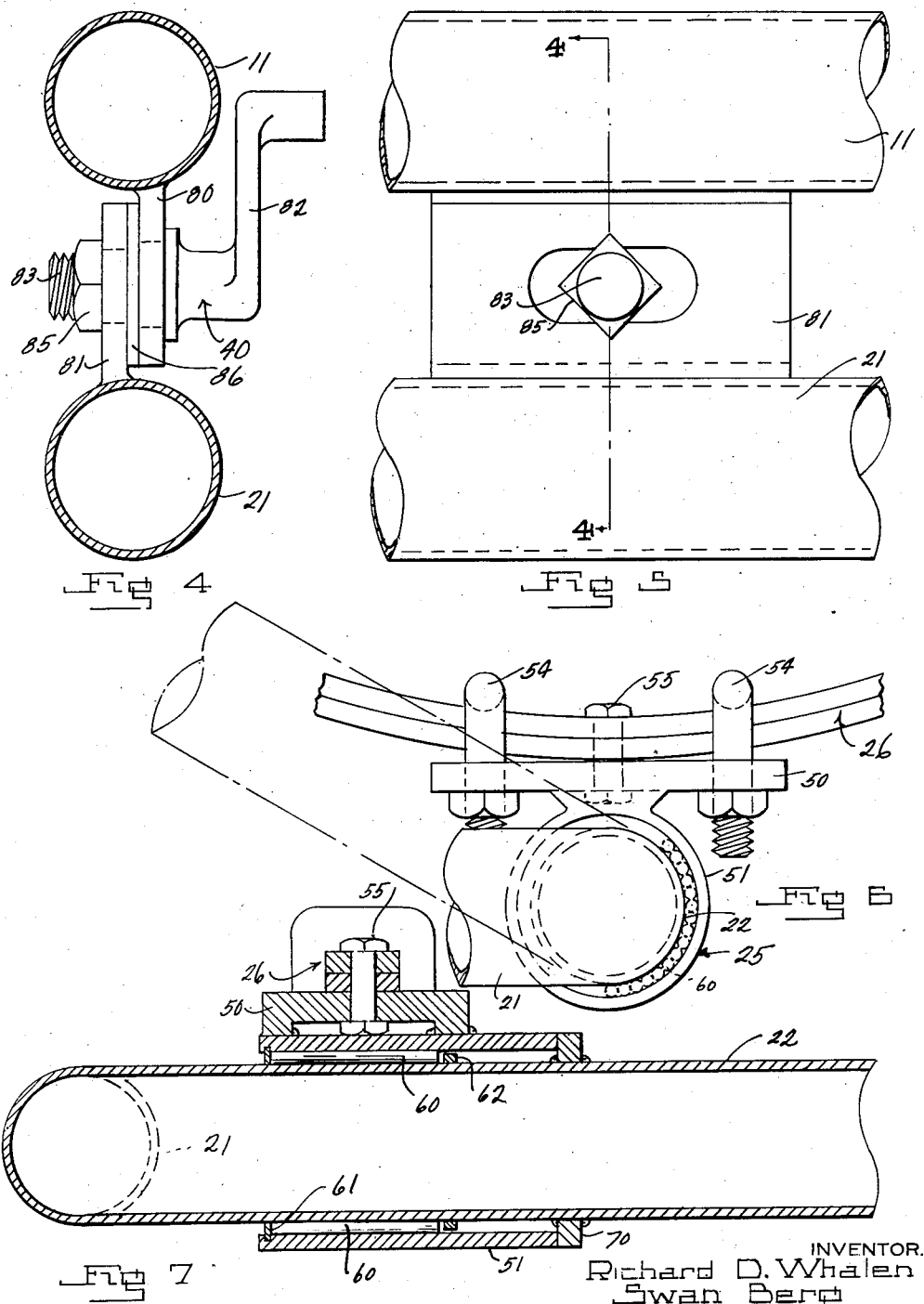

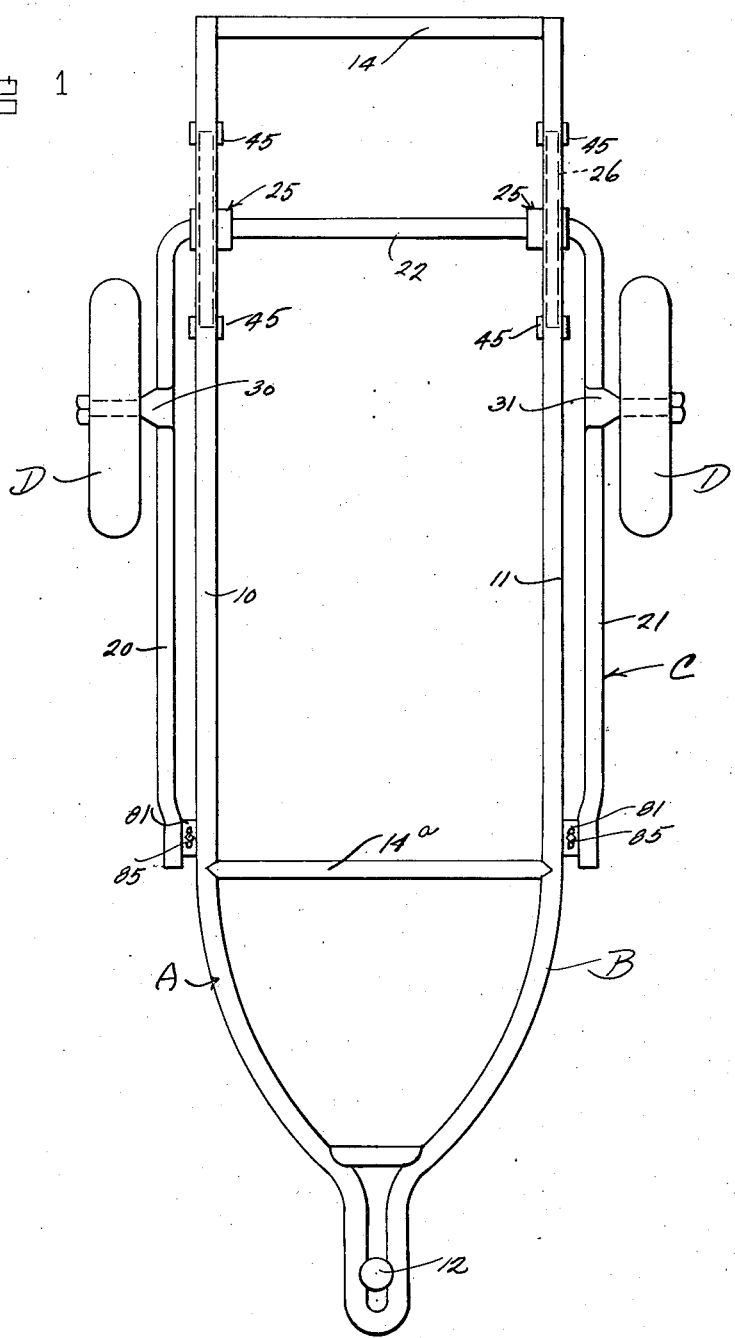

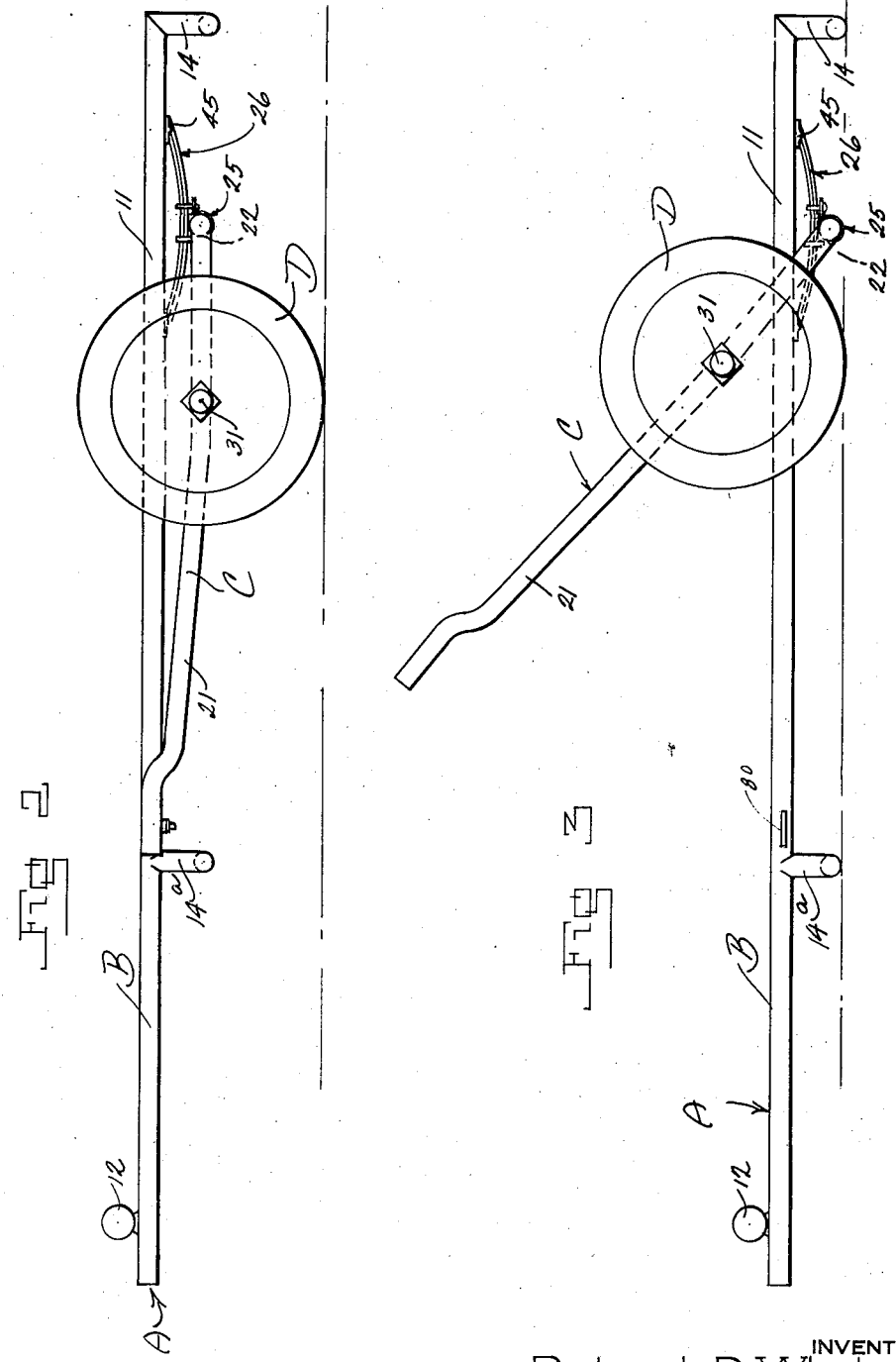

Patented Aug. 9, 1949

2,478,795

UNITED STATES PATENT OFFICE 2,478,795

TRAILER CONSTRUCTION

Richard D. Whalen and Swan Berg, Tampa, Fla.

Application August 7, 1946, Serial No. 689,016

2 Claims. (Cl. 280—43)

1

This invention relates to improvements in trailer constructions.

The primary object of this invention is the provision of an improved trailer construction including a chassis which may with facility be elevated and lowered for the purpose of conveniently elevating and lowering loads.

The usual manner of loading trailers is to either tilt the trailer and skid the load on the trailer, or by some outside mechanical means to lift the load and place it upon the trailer. The method of skidding the load onto the trailer is cumbersome and difficult, especially with heavy loads, and loading a trailer with a hoist requires additional equipment and expense. It is therefore an object of the present invention to provide a very practical and compact assemblage by means of which a single individual will be able to conveniently load a trailer.

A further object of this invention is the provision of an improved boat trailer including a chassis frame which may be lowered conveniently for the purpose of elevating a load.

Other objects and advantages of this invention will be apparent from the following detailed description taken in connection with the accompanying drawings, forming a part of this specification, and in which drawings—

Figure 1 is a plan view of the improved trailer in carrying or transporting position.

Figure 2 is a side elevation of the trailer showing the same in transporting position.

Figure 3 is a side elevation of the trailer showing the chassis frame lowered for loading or unloading.

Figure 4 is a cross sectional view taken through parts of the trailer substantially on the line 4—4 of Figure 5.

Figure 5 is a fragmentary view showing a detachable clamping arrangement.

Figure 6 is a fragmentary view showing a connection of an improved axle structure to the chassis frame or its spring.

Figure 7 is a cross sectional view taken through the bearing of the axle structure upon a spring of the chassis frame.

In the drawings, wherein for the purpose of illustration is shown but a preferred embodiment of the invention, the letter A generally designates the improved trailer construction, which includes a loading or chassis frame structure B having an improved mounting and axle structure C to which the running wheels D are connected.

The chassis frame structure B is optional as to arrangement. Preferably it is elongated and

2 consists of side rails 10 and 11 forwardly convergent and connected to a coupling 12 which may connect the trailer to the source of power. The rails 10 and 11 at their rear ends are connected by a cross bar 14 of a U-shaped construction including a cross bar proper which may rest upon the ground when the chassis frame is lowered and upstanding leg extensions such as shown in Figure 2 which are welded or otherwise secured to the ends of the rails 10 and 11. Similarly another U-shaped cross bar structure 14a may be connected forwardly of the running gear of the tractor. In fact any desired number of these cross bar structures may be provided.

The axle structure C preferably consists of side lever arms 20 and 21 and a cross bar 22. The cross bar is suitably connected by bearing structures 25, to be subsequently described, either directly to the chassis rails 10 and 11 or to bowed leaf spring structures 26 which may be attached to each of the rails 10 and 11.

The side portions 20 and 21 of the U-shaped axle are preferably provided with outwardly extending spindles 30 and 31, respectively, to which the running wheels D are connected in usual manner. The lever portions 20 and 21 of the U-shaped axle C are disposed outwardly in spaced relation with respect to the frame members 10 and 11. At their most forward ends the portions 20 and 21 may be connected to the rails 10 and 11 by suitable detachable connections 40 (shown in Figs. 4 and 5) to be subsequently described.

Referring to the bearing mounting of the axle structure C, the leaf springs 26 are connected by suitable shackles 45 to the respective rails 10 and 11. As more particularly shown in Figures 6 and 7 of the drawings, the springs 26 are each provided with bearing plates 50 having barreled housings 51 welded or otherwise secured thereto and depending therefrom. The plates 50 are suitably connected by U-shaped bolts 54 and a center bolt 55 to the springs 26 in a manner well understood in the art to which this invention relates. The barrel-shaped housing 51 receives therein roller bearings 60 bearing upon the cross bar 22 of the U-shaped axle and each held in place by a split lock ring 61 and a ring 62 welded or otherwise secured to the portion 22. A suitable axle stop 70 may be welded or otherwise secured to the axial portion 22 to definitely locate the bearing structures.

Referring to the clamping means 40, the rail portions 10 and 11 are each provided with rigidly connected flanged extensions 80, such as shown in Figure 4 and elsewhere transversely provided with a slot therein. Upon the lever portions 20 and 21 of the axle structure, at the outer ends thereof, are also provided complementary apertured flanged extensions 81. The coupling 40 includes a crank arm 82 having a screw threaded shank 83 adapted to extend through the openings in the flanges 80 and 81, as shown in Figure 4, and a nut 85 is adjustable on the shank 83. Of course a spacing washer 86 may be provided, if so desired. The slots in the arms 20 and 21 enable proper spring operation, since the bolt 82 and its nut 83 need not be tightly clamped upon the flanges 80 and 81.

Referring to the mode of operation, if it is desired to load, the connections 40 are removed and the chassis is lowered upon the ground to the position shown in Figure 3. The cross rails 14 and 14a rest upon the ground surface and the load may be readily skidded upon the cross rails or upon the chassis without much effort. This arrangement will be particularly advantageous in connection with loading and unloading boats in water, since the loading and unloading may be accomplished in very shallow water where there is less chance of bogging and waves are light. When the load is placed upon the chassis it is merely necessary for the operator to press downwardly upon the lever arms 20 and 21 of the axle structure. This will elevate the load, particularly at the running gear of the trailer. The lever arms 20 and 21 are then clamped to the frame rails 10 and 11 by the means 40 above described, and the front end of the trailer may be lifted and connected to the source of transportation power.

We would like it understood that it is not essential to provide the spring arrangement shown and the bearing arrangement may be altered to suit. The proportion of leverage with respect to the spindle centers may vary to suit. In the arrangement shown the dimensions of lever arms 20 and 21 from the spindles to the connections 40 is in proportion of about twice the length to the distance of the spindles to the spring connected cross bar 22.

It is, of course, obvious that the principle of this invention, so far as load elevating and lowering of the chassis is concerned, need not be restricted to trailer structures since it is entirely possible to apply the principle to a multi-wheeled vehicle.

Various changes in the shape, size and arrangement of parts may be made to the form of invention herein shown and described without departing from the spirit of the invention or the scope of the following claims.

We claim:

1. In a load receiving and transporting trailer, the combination of a vertically reciprocating trailer chassis having front and rear ends; a substantial U-shaped mounting and axle structure, including elongated side lever arms, having free ends, and a cross bar joining said arms; bearing means for the cross bar; means connecting the bearing means to the chassis, adjacent said rear end; running wheels; means rotatably mounting said wheels on said lever arms intermediate the lengths thereof, including spindles extending outwardly from said lever arms, with the longitudinal axes of said spindles extending beneath said chassis when said chassis is in a raised, load-transporting position and extending above said chassis when said chassis is in a lowered, load-receiving position; means for detachably connecting the free ends of said lever arms to said chassis when said axes are in said first-named positions, and means limiting reciprocation of said chassis to its lowered position, including cross bars depending from said chassis, said axes being above the axes of said last-named cross bars when said chassis is in said load-receiving position, the free ends of said lever arms extending above the horizontal plane of said chassis when said chassis is in its lowered position.

2. In a load receiving and transporting trailer, the combination of a vertically reciprocating trailer chassis having front and rear ends; a substantial U-shaped mounting and axle structure, including elongated side lever arms, having free ends, and a cross bar joining said arms; bearing means for the cross bar; means connecting the bearing means to the chassis, adjacent said rear end; running wheels; means rotatably mounting said wheels on said lever arms intermediate the lengths thereof, including spindles extending outwardly from said lever arms, with the longitudinal axes of said spindles extending beneath said chassis when said chassis is in a raised, load-transporting position and extending above said chassis when said chassis is in a lowered, load-receiving position; means for detachably connecting the free ends of said lever arms to said chassis when said axes are in said first-named positions, and means limiting reciprocation of said chassis to its lowered position, including cross bars depending from said chassis, said axes being above the axes of said last-named cross bars when said chassis is in said load-receiving position, the free ends of said lever arms extending above the horizontal plane of said chassis and forming acute angles with said chassis when said chassis is in its lowered position.

RICHARD D. WHALEN.
SWAN BERG.

REFERENCES CITED

The following references are of record in the file of this patent:

UNITED STATES PATENTS

| Number | Name | Date |
| --- | --- | --- |
| 537,871 | Toye | Apr. 23, 1895 |
| 1,050,352 | Deutschman | Jan. 14, 1913 |
| 1,135,545 | Oldroyd | Apr. 13, 1915 |
| 1,265,705 | Litchfield | May 7, 1918 |
| 1,956,245 | Moorman et al. | Apr. 24, 1934 |
| 2,141,781 | Allen | Dec. 27, 1938 |
| 2,179,477 | Berendsen | Nov. 14, 1939 |
| 2,227,762 | Ronning | Jan. 7, 1941 |